US007065617B2

(12) United States Patent
Wang

(10) Patent No.: US 7,065,617 B2
(45) Date of Patent: *Jun. 20, 2006

(54) EFFICIENT WRITE-WATCH MECHANISM USEFUL FOR GARBAGE COLLECTION IN A COMPUTER SYSTEM

(75) Inventor: Landy Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/828,877

(22) Filed: Apr. 20, 2004

(65) Prior Publication Data

US 2004/0199742 A1    Oct. 7, 2004

Related U.S. Application Data

(63) Continuation of application No. 09/628,708, filed on Jul. 31, 2000, now Pat. No. 6,738,875.

(51) Int. Cl.
*G06F 12/00*    (2006.01)

(52) U.S. Cl. .................. 711/159; 711/156; 711/170; 707/206

(58) Field of Classification Search .................. None
See application file for complete search history.

(56) References Cited

U.S. PATENT DOCUMENTS

| | | | |
|---|---|---|---|
| 4,989,134 A | 1/1991 | Shaw | |
| 5,237,673 A | 8/1993 | Orbits et al. | |
| 5,842,016 A | 11/1998 | Toutonghi et al. | |
| 5,845,298 A | 12/1998 | O'Connor et al. | |
| 5,848,423 A | 12/1998 | Ebrahim et al. | |
| 5,857,210 A | 1/1999 | Tremblay et al. | |
| 5,873,104 A | 2/1999 | Tremblay et al. | |

(Continued)

OTHER PUBLICATIONS

Anonymous, "A Comparison of Inferno and Java," *Computing Sciences Research of Bell Labs*, http://www.lucent-inferno.com/Page . . . tion/White_Papers/infernojava.html printed Jul. 12, 1999.

(Continued)

*Primary Examiner*—Reginald G. Bragdon
(74) *Attorney, Agent, or Firm*—Microsoft Corporation

(57) ABSTRACT

An efficient write-watch mechanism and process. A bitmap is associated with the virtual address descriptor (VAD) for a process, one bit for each virtual page address allocated to a process having write-watch enabled. As part of the write-watch mechanism, if a virtual address is trimmed to disk and that virtual address page is marked as modified, then the corresponding bit in the VAD is set for that virtual address page. In response to an API call (e.g., from a garbage collection mechanism) seeking to know which virtual addresses in a process have been modified since last checked, the memory manager walks the bitmap in the relevant VAD for the specified virtual address range for the requested process. If a bit is set, then the page corresponding to that bit is known to have been modified since last asked. If specified by the API, the bit is cleared in the VAD bitmap so that it will reflect the state since this time of asking. If the bit is not set, to determine if the page was modified, the page table entry (PTE) is checked for that page, and if the PTE indicates the page was modified, the page is known to be modified, otherwise that page is known to be unmodified since the last call. One enhancement uses page directory tables to locate a series of trimmed pages, sometimes avoiding the need to access the PTE.

20 Claims, 7 Drawing Sheets

U.S. PATENT DOCUMENTS

| | | | |
|---|---|---|---|
| 5,873,105 | A | 2/1999 | Tremblay et al. |
| 5,900,001 | A | 5/1999 | Wolczko et al. |
| 5,903,899 | A | 5/1999 | Steele, Jr. |
| 5,903,900 | A | 5/1999 | Knippel et al. |
| 5,909,579 | A | 6/1999 | Agesen et al. |
| 5,911,144 | A | 6/1999 | Schwartz et al. |
| 5,915,255 | A | 6/1999 | Schwartz et al. |
| 5,920,876 | A | 7/1999 | Ungar et al. |
| 5,930,807 | A | 7/1999 | Ebrahim et al. |
| 5,953,736 | A | 9/1999 | O'Connor et al. |
| 6,249,793 | B1 | 6/2001 | Printezis et al. |

OTHER PUBLICATIONS

Anonymous, "Blue—What is it," http://www.sd.monash.edu.au/blue/what-is-it.html printed Jul. 9, 1999.

Anonymous, "Cmm and Java Compared: A Comparison of Modern Languages for the Internet and Worldwide Web," (1997), http://nombas.com/us/otherdoc/javavcmm.html printed Jul. 12, 1999.

Anonymous, " Elements of Comparison Java/Hotjava vs. Caml/MMM," http://pauillac.inria.fr/~rouaix/mmm/currentjavacomp.html printed May 28, 1999.

Anonymous, "Garbage Collection for ISC Eiffel: An Overview," *ISE Technical Report*, TR-EI-56/GC, VERSION 3.3.9, http://eiffel.com/doc/manuals/technology'internal/gc/page.html printed Jul. 30, 1999.

Anonymous, "Object—Oriented Languages: A Comparison," http://eiffel.com/doc/manuals/technology/oo_comparison/page.html printed Jul. 12, 1999.

Anonymous, "Standard ML," http://cm.bell-labs.com/cm/cs/what/smlnj.html printed Jun. 1, 1999.

Atkinson et al., "Experiences Creating a Portable Cedar," *Proceedings of the Sigplan '89 Conference on Programming Language Design and Implementation, Sigplan Notices*, vol. 24, No. 7, pp. 322-329 (Jun. 21-23, 1989).

Aubrey, David, "Lucent's Inferno: A Devil of an OS," *Communications Week*, No. 633 (Oct. 14, 1996).

Bak et al., "The New Corp of Java Virtual Machines," *ACM Sigplan Notices*, vol. 33, No. 10, pp. 179-182 (Oct. 1998).

Barrett et al., "Garbage Collection using a Dynamic Threatening Boundary," *ACM Sigplan Notices*, vol. 30, No. 6, pp. 301-314 (1995).

Benett, John K., "The Design and Implementation of Distributed Smalltalk," *Proceedings of the Second ACM Conference on Object Oriented Programming Systems, Languages and Applications*, pp. 318-330 (Oct. 4-5, 1987).

Birrell et al., "Network Objects." *Software Practice and Experience*, vol. 25, No. S4, pp. S4/87-S4/130 (Dec. 1995).

Boehm et al., "Garbage Collection in an Uncooperative Environment," *Software—Practice and Experience*, vol. 18, No. 9, pp. 807-820 (Sep. 1988).

Böszörmenyi, Laszlo, "A Comparison of Modula-3 and Oberon-2 (extended version)," *Structured Programming*, vol. 14, pp. 15-22 (1993).

Brandis et al., " The Oberon System Family," *Institute for Computersysteme*, pp. 1331-1366 (Apr. 25, 1995).

Cahill et al., "Interfacing a Language to the Virtual Machine," *The Commandos Distributed Application Platform*, Springer-Verlag, pp. 209-233 (1993).

Cardelli et al., "Modula-3 Report (revised)," *SRC Research Report 52*, Preface, (Nov. 1, 1989), http://gatekeeper.dec.com/pub/DEC . . . -reports/abstracts/src-rr-052.html printed Jun. 1, 1999.

Cardelli et al., "The Modula-3 Type System," *Conference Record of the 16th Annual ACM Symposium on Principals of Programming Languages*, pp. 202-212 (1989).

Caudill et al., "A Third Generation Smalltalk-80 Implementation," *ACM Sigplan 1986 Conference on Object Oriented Programming Systems, Languages and Applications (OOPSLA '86)*, pp. 119-129 (1986).

Chambers et al. *Object-Oriented Programming: Systems, Languages and Applications OOPSLA '89 Conference Proceedings Sigplan Notices*, vol. 24, No. 10, pp. 49-70 (Oct. 1-6, 1989).

Clark et al., *The UCSD Pascal Handbook: A Reference and Guidebook for Programmers*, ChVIII, IX, X, pp. 153-172 (1982).

de Figueiredo et al., "The Design and Implementation of a Language for Extending Applications," *Proceedings of XXI Brazilian Seminar on Software and Hardware*, pp. 273-283 (1994).

de Figueiredo et al., "Lau: An Extensible Embedded Language," *Dr. Dobb's Journal*, vol. 21 No. 12, pp. 26-28, 32-33, 88, 90 (Dec. 1996).

Deutsch et al. "An Efficient, Incremental, Automatic Garbage Collector." *Communications of the ACM*, vol. 19, No. 9, pp. 522-526 (Sep. 1976).

Diwan et al., "Complier Support for Garbage Collection in a Statistically Typed Language," *ACM Sigplan Notices*, vol. 27, No. 7, pp. 273-282 (1992).

Diwan, Amer Sulman, "Understanding and Improving the Performance of Modern Programming Languages," *Department of Computer Science, Univeristy of Massachusetts (Amherst)*, pp. 1-137 (Feb. 1997).

Doligez et al., "A Concurrent Garbage Collector for Multithreaded Implementation of ML," *Papers of the 20th ACM Symposium on Principals of Programming Languages*, pp. 113-123 (Jan. 10-13, 1989).

Dömel, Peter, "Molbile Telescript Agents and the Web," *Compcon '96 Technologies for the information Superhighway Digest of Papers*, pp. 52-57 (1996).

Doward et al., "Inferno" *Proceedings IEEE Compcon 97*, pp. 241-244 (Feb. 23-26, 1997).

Doward et al., "Programming in Limbo," *Compcon 1997 Proceedings of IEEE Conference*, pp. 245-250 (1997).

Evans et al., "Garbage Collection and Memory Management," *OOPSLA '97, Addendum to the 1997 ACM SIGPLAN Conference on Object Oriented Programming, Systems, Languages and Applications*, pp. 138-143 (1997).

Fischer, André, "The Oberon Home Page," *Institute for Computersysteme* (Jul. 5, 1999), http://www.oberon.ethz.ch/oberon.html printed Jul. 7, 1999.

Fischer, André, "Oberon System 3 White Paper," *Institute for Computersysteme* (Feb. 11, 1999), http://www.oberon.ethz.ch/oberon/system3/white.html printed Jul. 8, 1999.

Floyd, Michael, "Comparing Object Oriented Languages," *Dr Dobb's Journal*, vol. 18, No. 11, pp. 104-105, 118 (Oct. 1993).

Franz et al., "Introducing Juice," (Oct. 30, 1996), http://caesar.ics.uci.edu/juice/intro/.html printed Jul. 7, 1999.

Gosling et al., "The Java Language Environment: White Paper," pp. 12-16, 70-73 (May 1996).

Gosling et al., *The NeWS Book: An Introduction to the Network/extensible Window System*, pp. 109-112, 147-161 (1989).

Gosling, James, "SunDew: A Distributed and Sensible Window System," *Proceedings of the 1996 Winter Usenix Technical Conference*, pp. 98-103 (1996).

Griswold, Ralph E., *The Macro Implementation of SNOBOLA: A Case Study of Machine-Independent Software Development*, Ch. 4, pp. 51-55, Ch. 5, p. 56, Ch. 6, pp. 65-78, Ch. 7, pp. 79-95, Ch. 9, pp. 142-155 (1972).

Haddon et al., "Experience with the Universal Intermediate Language Janus," *Software-Practice and Experience*, vol. 8, No. 5, pp. 601-616 (May 3, 1978).

Harbison, Sam, "Modula-3," *Byte*, vol. 15, No. 12, pp. 385-392. (Nov. 1990).

Harbison, Sam, "The Modula-3 Programming Language," *Dr Dobb's Journal*, vol. 19, No. 12, pp. 24-30 (Winter 1994).

Henderson et al., "A Comparison of Object-Oriented Programming in Four Modern Languages," *Software-Practice and Experience*, vol. 24, No. 11, pp. 1078-1095 (Jun. 20, 1994).

Holzle, Urs, "Adaptive Organization for SELF: Reconciling High Performance with Exploratory Programming," *Department of Computer Science, Stanford University* (Aug. 1994).

Howard, Rock, "A Quick Overview (Eiffel)," *Journal of Object Oriented Programming*, vol. 5, No. 8, pp. 76-78 (Jan. 1993).

Hudson et al., "Adaptive Garbage Collection for Modula-3 and Smalltalk," *OOPSLA/ECOOP '90 Workshop on Garbage Collection in Object-0oriented Systems*, pp. 1-5 (Oct. 27, 1990).

Hudson et al., "A Language Independent Garbage Collector Toolkit,"0 *University Massachusetts at Amherst, Department of Computer and Information Science, Technical Report*, pp. 1-23 (Sep. 1998).

Huelsbergen et al., "Very Concurrent Mark-&Sweep Garbage Collection without Fine Grain Synchronization," *ACM Sigplan Notices*, vol. 34, No. 3, pp. 166-175 (1998).

Hugunin, Jim, "Python and Java: The Best of Both Worlds," *Proceedings of the 6th Annual Python Conference* (1997) http://www.python.org/workshops/1997-10/proceedings/hugunin.html printed Aug. 11, 1999.

Jordan, Mick, "An Extensible Programming Environment for Modula-3," *SIGSOFT Software Engineering Notes*, vol. 15, No. 6, pp. 66-76 (1990).

Jul et al., "Fines Grained Mobility in the Emerald System," *ACM Transactions in Computer Systems*, vol. 6, No. 1, pp. 109-133 (Feb. 1988).

Kolling et al., "Blue-A Language for Teaching Object-Oriented Programming," *Proc. 27th SIGSCE Technical Symposium on Computer Science Education*, pp. 190-194 (Mar. 1996).

Kolling et al., "Requirements for a First Year Object-Oriented Teaching Language," *SIGSCE Bulletin*, 27(1), pp. 173-177 (Mar. 1995).

Lampson, Butler W., "A Description of the Cedar Language: A Cedar Language Reference Manual," *Xerox Corp., Palo Alto Research Center*, CSL-83-15, pp. 2-32 (Dec. 1983).

Lim et al., "A Memory Efficient Real-Time Non-Coping Garbage Collector," *ACM Sigplan Notices*, vol. 34, No. 3, pp. 118-129 (1998).

Marais et al., "An Overview of Oberon," *Institute for Computersysteme* (May 8, 1996), http://www.ics.uci.edu/~oberon/intro.html printed Jul. 7, 1999.

Milos et al., "Direct Implementation of Compiler Specifications of the Pascal P-Code Compiler Revisited," *Conference Record of the 11th Annual ACM Symposium on Principals of Programming Languages*, pp. 196-207 (Jan. 15-18, 1984).

Moon, David A., "Garbage Collection in a Large Lisp System," *Conference Record of the 1984 Symposium on LISP and Functional Programming*, pp. 235-246 (1984).

Mössenböck et al., "The Programming Language Oberon-2," *Institute for Computersysteme*, Report 156, pp. 1-26 (Mar. 1991).

Murer et al., "Iteration Abstracter in Sather," *ACM on Programming Languages and Systems*, vol. 23, No. 1, pp. 1-15 (Jan. 1996).

Nettles et al., "Real-Time Replication Garbage Collection," *ACM Sigplan Notices*, vol. 23, No. 6, pp. 217-226 (1993).

Oritz, Sizto Jr., "The Battle Over Real-Time Java," *Computer*, pp. 13-15 (Jun. 1999).

O'Toole et al., "Concurrent Replicating Garbage Collection," *ACM Sigplan Lisp Pointers*, vol. VII, No. 3, pp. 34-42 (1994).

Rémy et al., "Objective Calm—A General Purpose High-Level Programming Language," *ERCIM News*, No. 36, http://calm.inria.fr/ercim.html printed Jun. 1, 1999.

Robinson, Peter, "Modula-3 in an Undergraduate Computer Science Course," *The Second International Modula-2 Conference: Modula-2 and Beyond*, pp. 154-163 (Sep. 11-13, 1991).

Romer et al., "The Structure and Performance of Interpreters," *ACM SIGOOPS Operating Systems Review*, vol. 30, No. 5, pp. 150-159 (1996).

Rook, David, "A Language Collector Comments On: Java, Perl & Python," (Oct. 1997), http://www.chips.navy.mil/chips/archives/97_oct/file12.html printed Jul. 12, 1999.

Schmidt et al., "CLOS, Eiffel and Sather: A Comparison," *International Computer Science Institute, Technical Report* No. TR-91-047, pp. 1-24 (Sep. 1991).

Shiffman, Hank, "Making Sense of Java," http://www.dis-ordered.org/Java-QA.html printed Jul. 12, 1999.

Skulski, Wojtek, "Oberon Resources for Linux," (Jun. 1998), http://linux).nsrlochester.edu/~skulski/LinuxOberon.html printed Jul. 8, 1999.

Smith et al., "Comparing Mostly-Coping and Mark-Sweep Conservative Collection," *ACM Sigplan Notices*, vol. 34, No. 3, pp. 68-78 (1998).

Tardo et al., "Mobile Agent and Telescript," IEEE Compcon pp. 58-63 (1996).

Templ, Joesef, "Oberon vs. C++," *The Modula Tor: Oberon-2 and Modula-2 Technical Publication*, No. 9 (Oct., 1994), http://www.modulaware.com/mdlt49.html printed Jul. 7, 1999.

Thorn, Tommy, "Programming Languages for Mobile Code," *ACM Computing Surveys*, vol. 29, No. 3, pp. 214-239 (Sep. 1997).

van Rossum, Guido, "An Introduction to Python," pp. 1-4 (Aug. 1997), http://www.python.org/doc/Summery.html printed Jun. 2, 1999.

van Rossum, Guido, "Extending and Embedding the Python Interpreter," *Corporation for National Research Initiatives CNRI*, Release No. 1.5.2., (Jul. 1999), http://www.python.org/doc/ext/intro.html printed Aug. 11, 1999.

Waddington et al., "Java: Virtual Machine for Virtually any Platform," *Embedded Systems Programming*, vol. 9, No. 6, pp. 26-42 (Jun. 1996).

Waldo, Jim, "Programming with Java," *Unix Review*, vol. 14, No. 5, pp. 31-37 (May 1996).

Walton, Robert Lee, "R-Code a Very Capable Virtual Computer," *Harvard University, Center for Research Computing Technologies, Technical Report* No. TR-37-95, pp. 1-187 (Oct. 1997).

Watters, Aaron R, "The What, Why, Who and Where of Python," (Jan. 25, 1997), http://www.networkcomputing.com/unixworld/tutorial/005/005.html printed May 28, 1999.

Weiner, Richard, "Watch Your Language," *IEEE Software*, vol. 15, No. 3, pp. 55-56 (May/Jun. 1998).

Weis, Pierre, "What is Calm," (Jan. 1996), http://calm.inria.fr/FAQ/general-eng.html printed Jun. 1, 1999.

Weiser et al., "The Portable Common Runtime Approach to Interoperability," *Operating Systems Reviews, Proceedings of the 12th ACM Symposium on Operating System Principals*, vol. 23, No. 5, pp. 114-122 (Dec. 3-6, 1989).

Wilder, Dan, "Introduction to Eiffel," *Linux Journal, vol. 14*, pp. 34-39, 56, 60 (Jun. 1995).

Wilson, Paul, "Uniprocessor Garbage Collection Techniques," *Proceedings of the 1992 Workshop on Memory Management*, pp. 1-34 (1992).

Youmans, Bryan, "Java: Cornerstone of the Global Network Enterprise," *Virginia Tech, CS 3604* (Feb. 7, 1997), http://ei.cs.vt.edu/~history/Youmans.Java.html printed Jul. 8, 1999.

Yurkoski et al., "Using Inferno to Execute Java on Small Devices," *ACM Sigplan Workshop LCTES '98*, pp. 108-118 (Jun. 19-20, 1998).

Anonymous, "What is Python," http://www.python.org/doc/Summery.html printed Jun. 2, 1999.

Agesen et al., "Garbage Collection and Local Variable Type Precision and Liveness in Java Virtual Machine," *ACM Sigplan Notices*, vol. 33, No. 5, pp. 269-279 (May, 1998).

Lucent Technologies, "What is Inferno?", Inferno User's Guide, Dec. 19, 1997, pp. 1.1-1.12, USA.

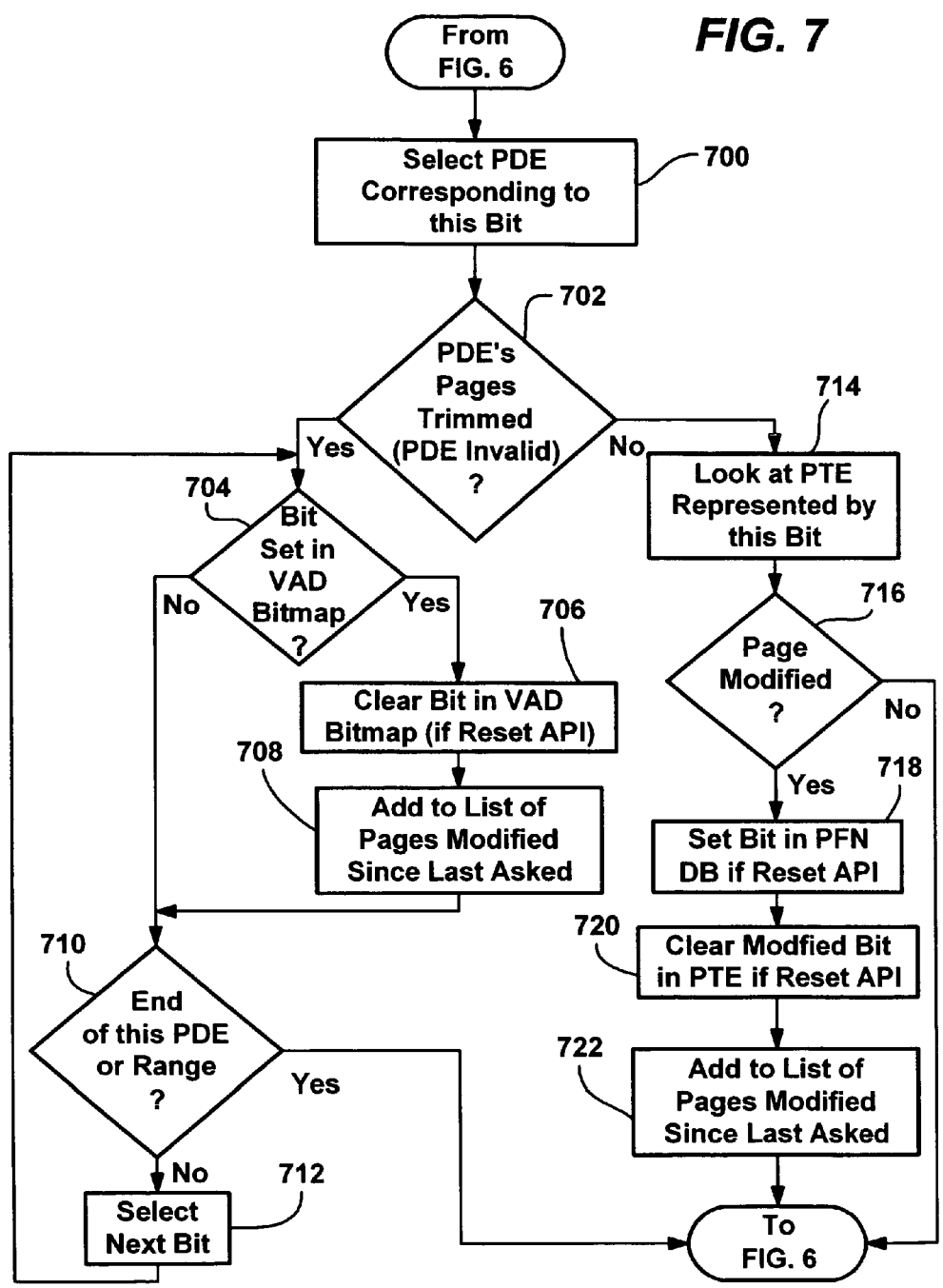

EFFICIENT WRITE-WATCH MECHANISM USEFUL FOR GARBAGE COLLECTION IN A COMPUTER SYSTEM

CROSS-REFERENCE TO RELATED APPLICATION

This application is a continuation of U.S. application Ser. No. 09/628,708 filed Jul. 31, 2000, now U.S. Pat. No. 6,738,875 B1, issued May 18, 2004.

FIELD OF THE INVENTION

The invention relates generally to computer systems, and more particulary to memory management in computer systems.

BACKGROUND OF THE INVENTION

Application programs often allocate memory that is not used, or is used briefly and then unused thereafter. As memory is a resource that may become scarce, application programs are supposed to deallocate memory that is no longer needed. However, applications often fail to do so, and this memory misuse leads to low memory conditions and otherwise degrades system performance. Applications also tend to access memory after they manually free it, which also causes major problems.

The concept of "garbage collection" has been developed to automatically manage application memory by reclaiming memory space allocated to applications that is not being used. Garbage collection operates on behalf of the application, without the application's assistance, to look for objects that are unused. A garbage collector operates by scanning for cross-generation pointers in memory, which indicate an object still in use. One type of garbage collection is sequential in nature, wherein a garbage collection mechanism runs whenever memory is needed. While the collection mechanism is run to analyze the memory (e.g., a set of allocated objects) that is not being used, the application is temporarily halted so that it cannot be modifying memory. A significant problem with sequential garbage collection is that the application often experiences inconvenient and/or undesirable pauses during the collection operation.

Another type of garbage collection is concurrent in nature, wherein the garbage collectors run at the same time as the application and collect only a portion of unused memory at a time. Only when the collector has done the bulk of its work is the application temporarily halted to prevent it from writing to memory just as that memory is being freed, whereby the application is not significantly paused. To look for objects that are unused, the garbage collector enumerates locations that have been written into so it can scan for the cross-generation pointers, i.e., rather than scan large amounts of system memory, only changed memory is examined. However, this requires a more complex collector to concurrently track memory that is being actively used by an application, and also requires multiple passes to locate any memory earlier determined to be unused but that an application has since used while the collector was performing other work.

To track which memory has changed with contemporary operating systems and microprocessors, write-protect and write-watch are techniques that have been attempted. Write-protect generally operates by protecting sections of memory (e.g., pages) allocated to an application. Then, whenever the application writes to a protected page, a page fault is triggered. By the page fault, the collector thus knows that this page was written to, and can record the page as changed, e.g., in some data structure used for tracking changed pages. The collector then unprotects the page to allow the change and allow the application to use it. Some time later, the collector will free unused memory and reset the tracking process. Conventional write-watch is somewhat similar to write-protect, except that write-watch tracks memory usage without protecting the page and generating the page fault exception.

While write-protect and write-watch thus enable concurrent garbage collection mechanisms, such mechanisms have heretofore been highly inefficient. Indeed, write-protect is significantly slower than write-watch. At the same time, past write-watch techniques have degraded system performance so significantly that that a number of write-watch garbage collection efforts have been abandoned.

SUMMARY OF THE INVENTION

Briefly, the present invention provides a method and system that enables an efficient write-watch mechanism, while adding as little as one bit per virtual page address being watched, and that operates without substantially degrading performance even on large address ranges. To this end, a bitmap is associated with the Virtual Address Descriptor (VAD) for a process, one bit for each virtual page address allocated to a process with write-watch enabled. As part of the write-watch mechanism if a virtual address is trimmed to disk and that virtual address page is marked as modified, then the corresponding bit in the VAD is set for that virtual address page. Only when a modified page is trimmed is the bitmap accessed during normal system operation, providing extremely fast write-watching.

The memory manager may receive an API call (e.g., from a garbage collection mechanism) seeking to know which virtual addresses in a process have been modified since last checked, e.g., since the last time the garbage collection mechanism asked. To determine this, the memory manager walks the bitmap in the relevant VAD for the specified virtual address range for the requested process. If a bit is set, then the page corresponding to that bit is known to have been modified since last asked. The bit is cleared in the VAD bitmap (if specified by the API), and a result returned for that page, (e.g., the page number is added to an array that is returned).

If the bit is not set, then there is still a chance that the page was modified, just not trimmed. To determine if the page was modified, the page table entry (PTE) is checked for that page, and if the PTE indicates the page was modified, a corresponding bit is set in the PFN database, the modified bit in the PTE is cleared, (if reset is requested by the API, any other processors are interrupted), and the result may be returned for that virtual page address. Otherwise that page is known to be unmodified since the last call.

One enhancement to the present invention looks at the page directory tables corresponding to the write-watched pages for that process for which status has been requested, each of which indicates whether a group of (e.g., 1024) pages have been trimmed. If the pages have been trimmed, then any zero bits in the VAD corresponding to this group are known to be unmodified, since any modified, trimmed page would have had its bit set in the VAD when trimmed. The portion of the VAD bitmap corresponding to the trimmed page directory thus reflects the modified state of pages in this page directory, whereby the PTE need not be checked for that portion. An appropriate result is returned to the caller, and the bitmap portion cleared (if requested) so that it will reflect whether it has been modified since the time last asked.

Other advantages will become apparent from the following detailed description when taken in conjunction with the drawings, in which:

BRIEF DESCRIPTION OF THE DRAWINGS

FIGS. 6–7 comprise a flow diagram generally representing how virtual address write-watch information is determined for returning to a requesting caller in accordance with an aspect of the present invention.

DETAILED DESCRIPTION OF THE PREFERRED EMBODIMENT

Exemplary Operating Environment

Figure 1:
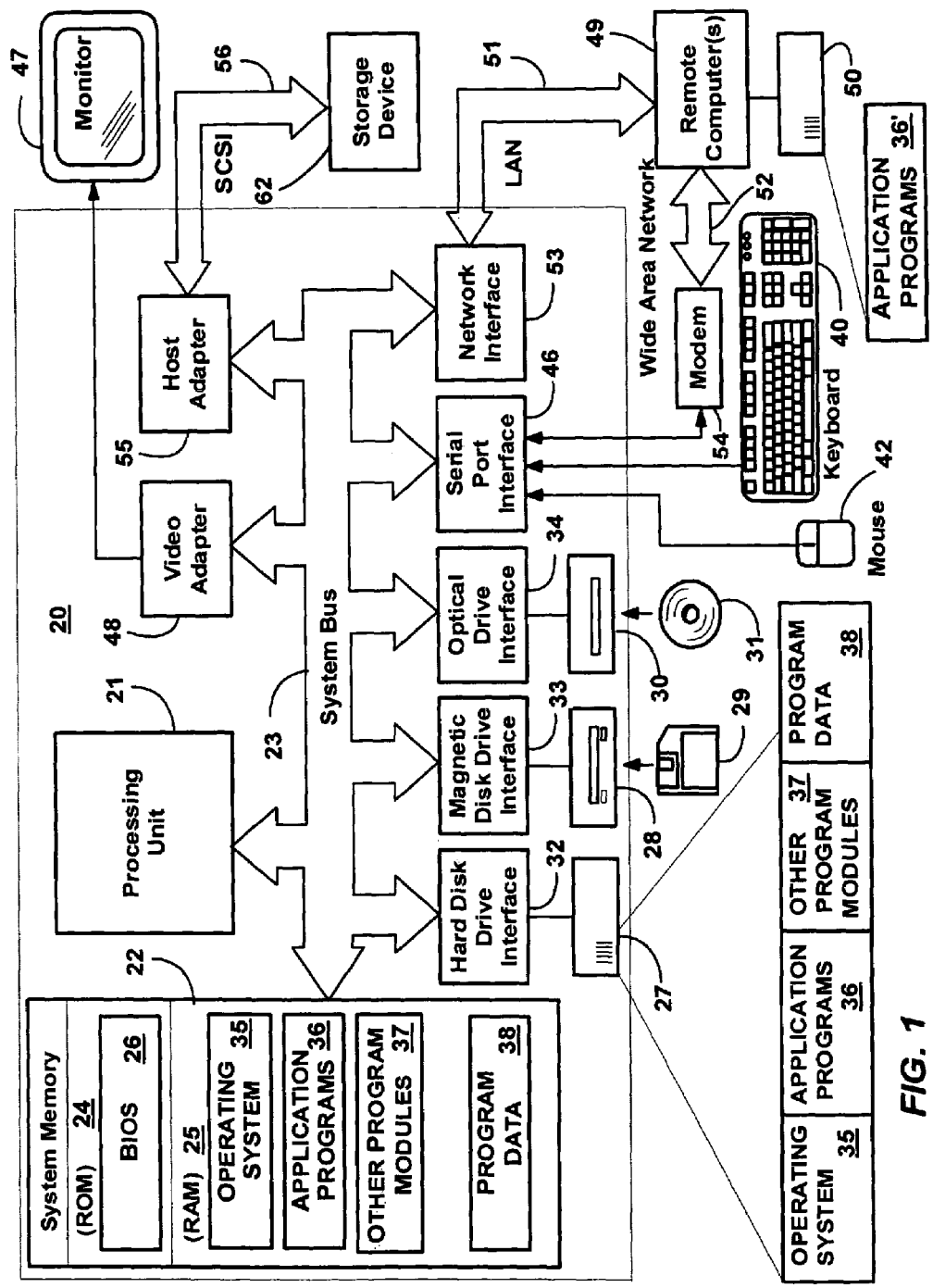
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Note that the present invention is described herein with respect to the Windows® 2000 (formerly Windows® NT®) operating system. However, as can be readily appreciated, the present invention is not limited to any particular operating system, but rather may be used with any operating system, and moreover, has many uses in general computing.

Efficient Write-Watch

As will be understood, the present invention is primarily directed to an efficient write-watch mechanism and process, as described in the Microsoft Windows® 2000 operating system/environment, that are useful for garbage collection mechanisms. Nevertheless, it should be understood that the present invention is capable of operating with virtually any operating system and/or operating environment, and may be used for write-watch purposes other than for garbage collection, e.g., for detecting processes that corrupt others' memory. Moreover, as used herein, the term "page," "pages" or the like represent any section of memory, fixed or variable in size, that can be manipulated by computer memory management.

Figure 2:
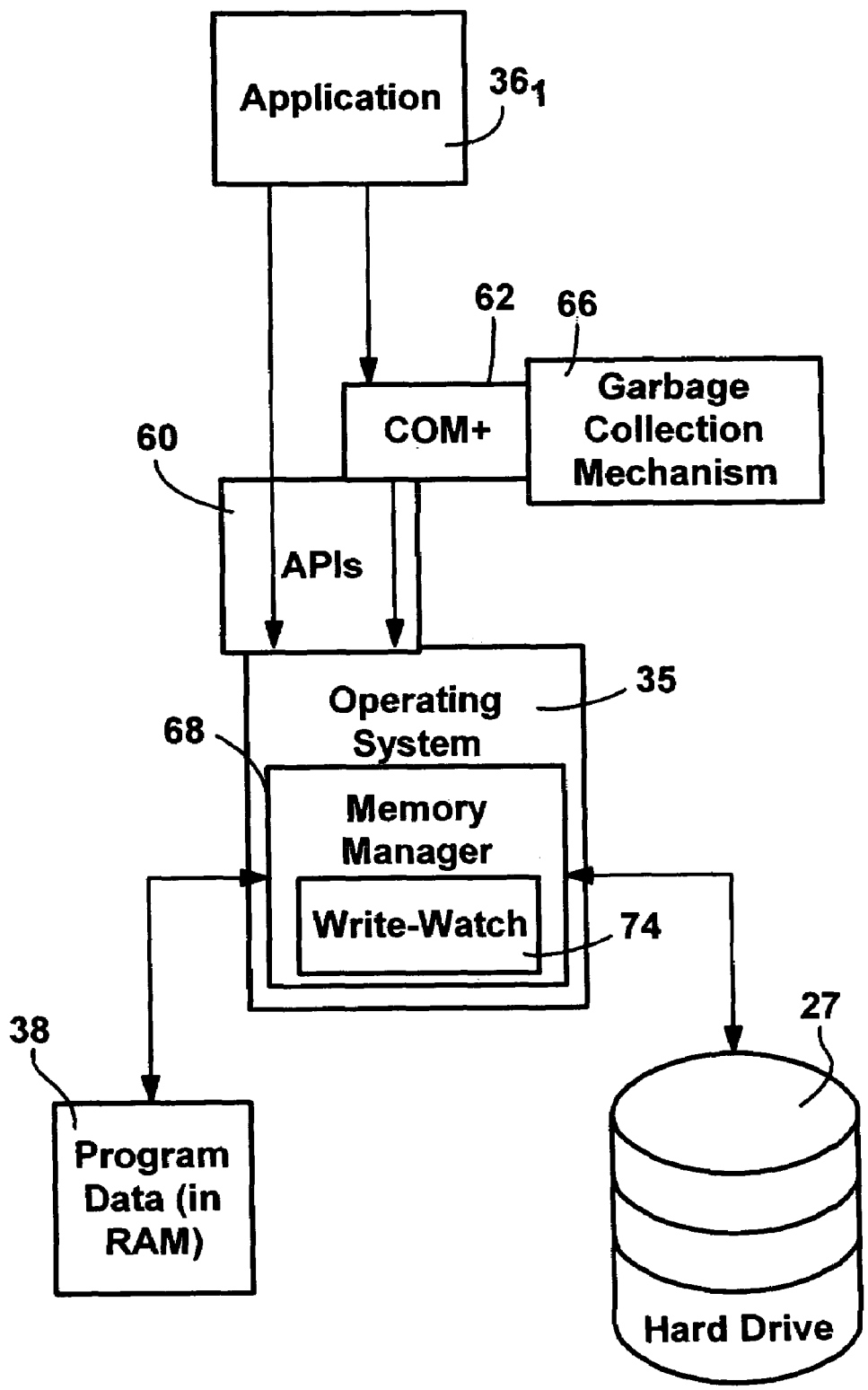
FIG. 2 is a block diagram generally representing exemplary components for performing efficient write-watching in accordance with various aspects of the invention.

Turning to FIG. 2 of the drawings, there is shown exemplary components for performing efficient write-watching in accordance with various aspects of the invention. In general, an application $36_1$, places application programming interface (API) calls to the operating system 35 through a set of APIs 60 to perform various tasks. The application $36_1$ may also interface with an application environment, such as COM+ 62 or the like. The COM+ environment 62 may include a garbage collection process/mechanism 66, e.g., the garbage collection mechanism 66 may be built into or otherwise associated with the architecture 62. Via API calls or the like, the COM+ architecture works with a memory manager 68 in the operating system 35 to transparently and concurrently (relative to the application) implement garbage collection. In keeping with the invention as described below, such calls will result in information (e.g., an array of virtual memory locations) that indicate which virtual memory addresses have been written to ("modified" or sometimes referred to as "dirtied") since the last time that the garbage collection mechanism 66 called. In this manner, the garbage collection mechanism 66 will know the locations that it needs to scan to see whether it can free objects or the like. Note that as shown herein, the garbage collection mechanism 66 operates as part of COM+ 62, however as can be readily appreciated, the mechanism can be implemented in many ways, including, for example, a separate application running in the background, integrated into the operating system, in other architectures layered between the application an the operating system, and so forth.

As will be understood, a suitable garbage collection mechanism 66 is concurrent in that it does not significantly interrupt the application $36_1$ as it operates to free up virtual memory. However, as will become apparent, the present invention will provide benefits with any component that needs to know when memory has been written to since last asked, including, for example, sequential garbage collection mechanisms. For purposes of simplicity, the garbage collection mechanism 66 will not be described in detail herein, except to generally note that it places calls specifying that certain memory be write-watched, and then calls as desired to find which of that write-watched memory has changed since it last asked. For flexibility, the calling mechanism can determine whether the call should reset the state to write-watch anew, or leave the state as is, e.g., the garbage collection mechanism 66 can inquire as to which virtual page addresses have changed, without being considered as having asked and thereby resetting the states. Although not described in detail herein, a separate reset call or the like may be provided to rapidly reset an entire range of virtual page addresses without reporting whether the virtual page addresses in the range have been dirtied.

The operating system 35 enables the use of virtual memory via the memory manager 68. Virtual memory allows an application to address large amounts of memory (e.g., up to four gigabytes) even though a machine may not have that much physical RAM. The memory manager 68 works with or otherwise includes a cache manager (not separately shown) to provide addressable memory beyond the amount of RAM in the system via disk swapping techniques. Memory management is further described in the references, "*Inside Windows NT®*, " by Helen Custer, Microsoft Press (1993); and "*Inside Windows NT®, Second Edition*" by David A. Solomon, Microsoft Press (1998), hereby incorporated by reference herein.

Figure 3:
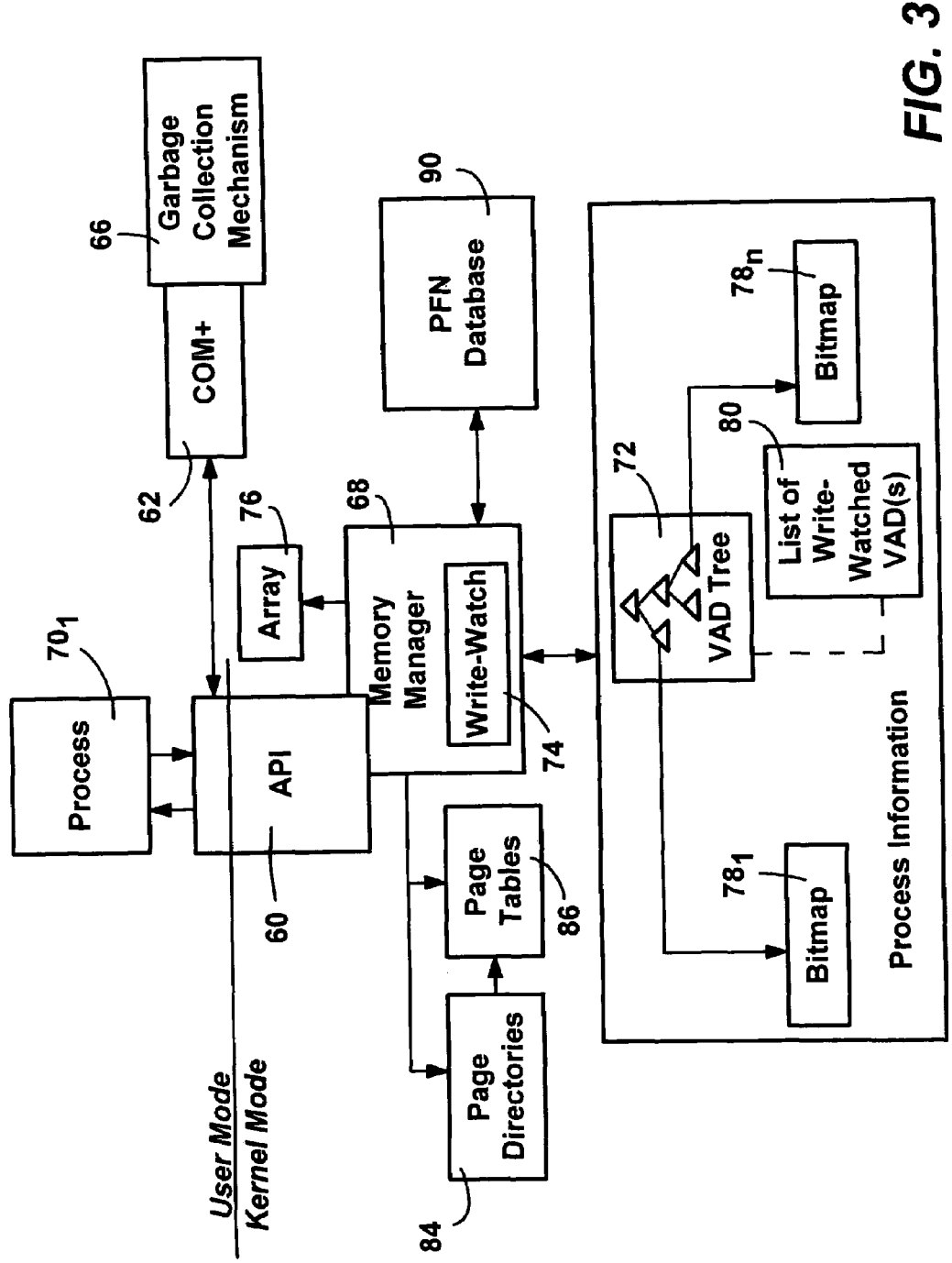
FIG. 3 is a block diagram generally representing exemplary components and information maintained for processes and used by the memory manager to perform efficient write-watching in accordance within accordance with an aspect of the present invention.

To manage virtual memory, the memory manager 68 maintains a set of information on a per-process basis, e.g., as generally represented in FIG. 3, for the process $70_1$ (which may be a process of the application $36_1$). One piece of information that the memory manager 68 maintains for each process is a list of the virtual addresses that have been allocated for that process, maintained in a virtual address descriptor (VAD) tree 72 for rapid searching. For example, whenever a process (e.g., $70_1$) requests access to some specified memory location or locations, the memory manager 68 searches the VAD tree 72 to determine whether the process $70_1$ is entitled to access the specified virtual memory.

In accordance with one aspect of the present invention, a range of virtual memory allocated to a process (e.g., $70_1$) may be specified as write-watched, via an API call (e.g., VirtualAlloc (n, writewatch), where n is the number of allocation units requested, which in Windows® 2000 are referred to as pages). Then, as described below, when later asked, e.g., via a GetWriteWatch( ) API, GetResetWriteWatch( ) API or the like, the memory manager 68, via a write-watch process/mechanism 74, will efficiently determine whether a requested range of virtual page addresses has been written to (on a per page basis) since the last time the reset call was placed, and provide this information to the caller. In one implementation, an array 76 identifying modified virtual page addresses is returned in response to a call, although as can be readily appreciated, the information may be returned in other ways, e.g., a corresponding bitmap of ones and zeroes indicating whether each virtual page address in a specified range is modified or unmodified may be alternatively returned.

To efficiently track whether a virtual page address is modified (sometimes referred to as "dirty" or "dirtied") or unmodified, a preferred embodiment of the present invention employs a combination of information, some of which is already maintained by the operating system 35, along with a new set of information. For efficiency, in one embodiment the new set of information comprises a single bit per virtual page address associated with each page range maintained in the VAD tree 72, i.e., each VAD in the VAD tree 72 that is write-watched has a bitmap (e.g., $78_1$) allocated thereto, having a size corresponding to the number of virtual page addresses in the range. For example, a VAD entry in the VAD tree 72 representing twenty virtual page addresses will have a bitmap of twenty bits in size, although as can be appreciated, the bitmap may be larger (rounded up to the nearest byte boundary), or, although less efficient, more than one bit can be used to track a given virtual page address's write-watch status. As described below, however, a single bit per virtual page address may be used to track the write-watch state.

In accordance with one aspect of the present invention, each write-watch bitmap $78_1$–$78_n$ in the VAD tree 72 includes bits with values that indicate whether a virtual page address that the bit represents was modified at a time it was trimmed to disk. More particularly, and as generally described below with reference to the flow diagram of FIG. 5, memory management often requires that a page's data in physical RAM be cached to disk so that the RAM page can be used for another application, while preserving the previous information. If the write-watched page is marked as modified, the corresponding bit in the appropriate write-watch VAD bitmap (e.g., $78_1$) is set at the time the page is written to disk ("trimmed"). Then, when later asked whether that range is modified, the memory manager 68 can efficiently return the information directly from the relevant VAD, without having to access the disk. Note that rather than walk the entire VAD tree 72 for write-watched virtual page address ranges, e.g., to locate the relevant VAD and its associated bitmap $78_1$, a separate linked-list 80 of write-watched VADs may be maintained to provide more-efficient write-watch servicing, since typically such lists are relatively small compared to the entire VAD tree 72.

Figure 4:
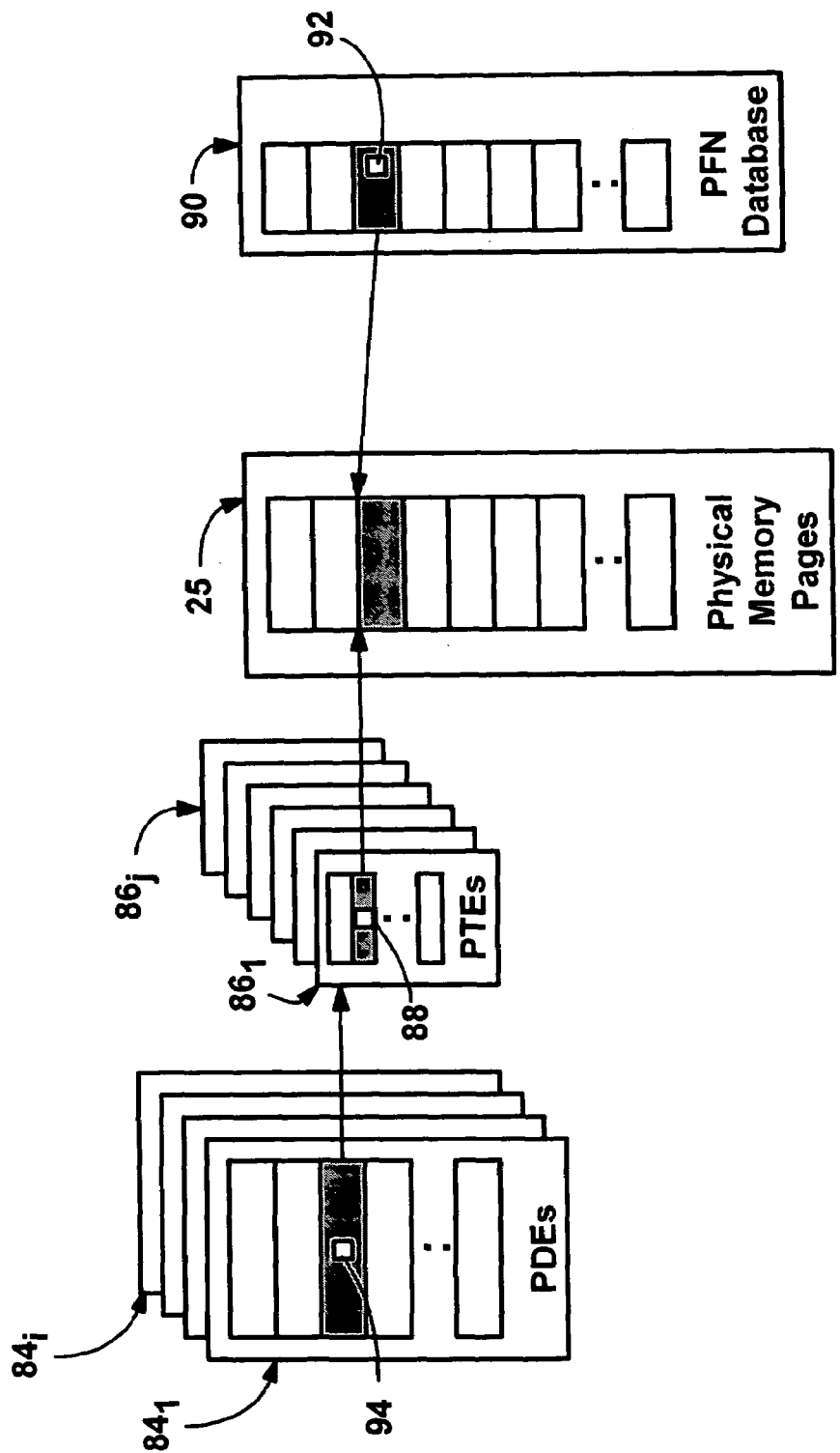
FIG. 4 is a block diagram generally representing the organization of the information in an exemplary computer system used by the memory manager to perform efficient write-watching in accordance with an aspect of the present invention.

If the bit in the VAD bitmap $78_1$ is not set, it does not mean that the virtual page address is not modified. Instead, it means either that the virtual page address was not written to, or was modified, but not trimmed to disk. In this situation, the memory manager 68 may determine whether the virtual page address is modified based on a flag maintained with the virtual page address mapping information. More particularly, as generally represented in FIG. 4 and described in the aforementioned *Inside Windows NT®* references, each process that has virtual memory allocated thereto has one or more page directories $84_1$–$84_i$ maintained therefor by the memory manager 68, primarily used for converting a virtual address to a physical page of memory. The relevant virtual page address directory is located from part (e.g., the upper bits) of the virtual address provided by the application $36_1$. Each page directory (e.g., $84_1$) has a number of page directory entries (PDEs), wherein each entry serves as an index to one of a set of page tables $86_1$–$86_j$. Each page table (e.g., $86_1$) includes page table entries (PTEs), one of which (indexed from another part of the virtual address) identifies the actual physical page in memory (RAM 25), along with flags regarding the state of the virtual page address, such as whether the virtual page address is currently mapped to a physical page (valid) or has been trimmed to disk (invalid). One of the flags, represented as the flag location 88 in FIG. 4, has a value that indicates whether the virtual page address has been modified since last mapped to a physical page (e.g., recalled from disk). Note that this tracking is already done by the memory manager 68 in the Windows® 2000 operating system, and thus no extra time is taken by the write-watch mechanism 74 to track this information during memory writing operations.

In accordance with one aspect of the invention, if a given virtual page address in the specified range was not both written to and trimmed to disk, (i.e., the relevant bit in the relevant VAD bitmap $78_1$ is not marked), the memory manager 68 instead determines whether that virtual page address is unmodified or modified based on the flag 88 setting in the page table entry for that virtual page address. However, because the write-watch process 74 may be concerned with whether the virtual page has been modified since last asked in a write-watch call, this flag cannot remain set in a GetResetWriteWatch( ) API call, else it would always indicate modified while the page is valid (i.e., in actual memory, not trimmed to disk), including possibly in the next call. Thus, the flag 88 needs to be cleared once it is used by the write-watch mechanism 74 in the memory manager 68. However, the information of the modified state of the page cannot be lost, else it may not be properly swapped to disk, and is thus written to another database of information, a PFN database 90 has a modified flag 92 set in an atomic operation. Note that the PFN database 90 maintains state information about the actual physical memory installed in a system, e.g., there is a record in the PFN database 90 for each page of physical memory, not one for each virtual memory page address. The PTE flag 88 may then be cleared. Note that in a multi-processor system, any other processors are interrupted at this time, since they may be sharing the PTE. When later trimming pages, the memory manager 68 can then determine whether a page in physical memory is unmodified or modified based on the PFN database flag 92 instead of the PTE flag 88 (either flag marked as modified indicates that the page data has changed relative to the disk copy and thus the in-memory page needs to be preserved).

To enhance the speed of determining whether the virtual page addresses in a specified write-watch range have been modified, prior to checking the PTE for a virtual address that was not marked as modified in the VAD bitmap $78_1$, a flag 94 in the relevant entry in the page directory $84_1$ is checked to determine whether the page directory is marked as trimmed, e.g., the entire set of virtual page addresses referenced via that page directory $84_1$ have been trimmed to disk. If so, then it is known that the virtual page address in question was trimmed, whereby the relevant bitmap $78_1$ in the VAD tree 72 reflects the modified or unmodified state of each virtual page address corresponding to the page directory $84_1$. Note that as described above, this is because virtual address pages that are modified and trimmed have their modified status rippled up to the VAD bitmap $78_1$ at the time of trimming. In other words, any unmarked (e.g., zero) bits in the VAD bitmap $78_1$ corresponding to this range are known to represent unmodified virtual page addresses, since any modified, trimmed page has its bit set in the VAD bitmap $78_1$ when trimmed. The portion of the VAD bitmap $78_1$ corresponding to the trimmed page directory thus reflects the modified or unmodified state of pages in this page directory, whereby the PTE need not be located and checked (and processors interrupted) for any pages in that trimmed part of the range. As can be readily appreciated, simply running the VAD bitmap $78_1$ is significantly faster than checking a set of PTEs.

Figure 5:
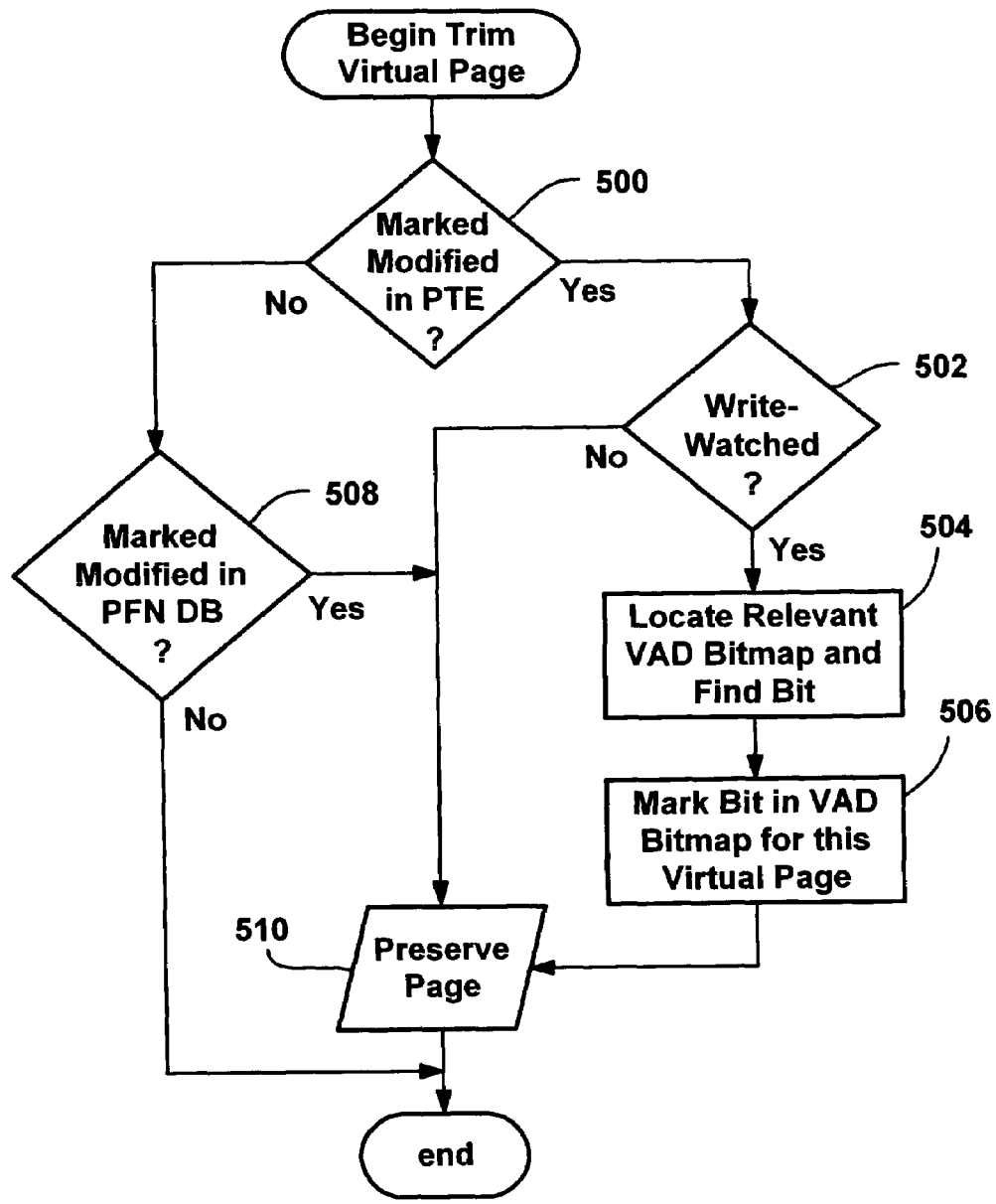
FIG. 5 is a flow diagram generally representing steps taken to track modified pages when pages are trimmed to disk in accordance with an aspect of the present invention.

Turning to an explanation of the operation of the present invention, FIG. 5 represents one part of the write-watch mechanism 74 in the memory manager 68 that sets the relevant bit in the VAD bitmap $78_1$ whenever a modified page is trimmed to disk. As can be seen in this simplified flow diagram, via step 500 only pages marked as modified in the PTE are considered when updating the VAD bitmap $78_1$, however via step 508 a page that is not marked as modified in the PTE but marked as modified in the PFN database 90 is still preserved. If marked modified in the PTE at step 500, the trimming process determines at step 502 whether the virtual page address is being write-watched, e.g., by examining the short list 80 (FIG. 3) of write-watched page ranges for this process $70_1$. If not write-watched, the page is trimmed as normal (step 510), otherwise steps 504 and 506 are first executed to locate and set the relevant bit in the write-watch VAD bitmap $78_1$ before the page is trimmed. Note that during normal write-watch operation, (e.g., not considering the operations during the various write-watch API calls), the relevant VAD bitmap $78_1$ only need be accessed to set the relevant bit when a modified page is trimmed, thus keeping the overall write-watch process 74 highly efficient. In other words, while it would be feasible to set the relevant bit in the VAD bitmap $78_1$ whenever a virtual page address is modified, such an extra step on each memory write would degrade system performance. Instead, the performance hit of updating the VAD bitmap $78_1$ occurs only when a page is trimmed to disk during low physical memory conditions, (memory pressure), and indeed, this is relatively insignificant compared to the impact on system performance as pages are swapped to and from disk.

Figure 6:
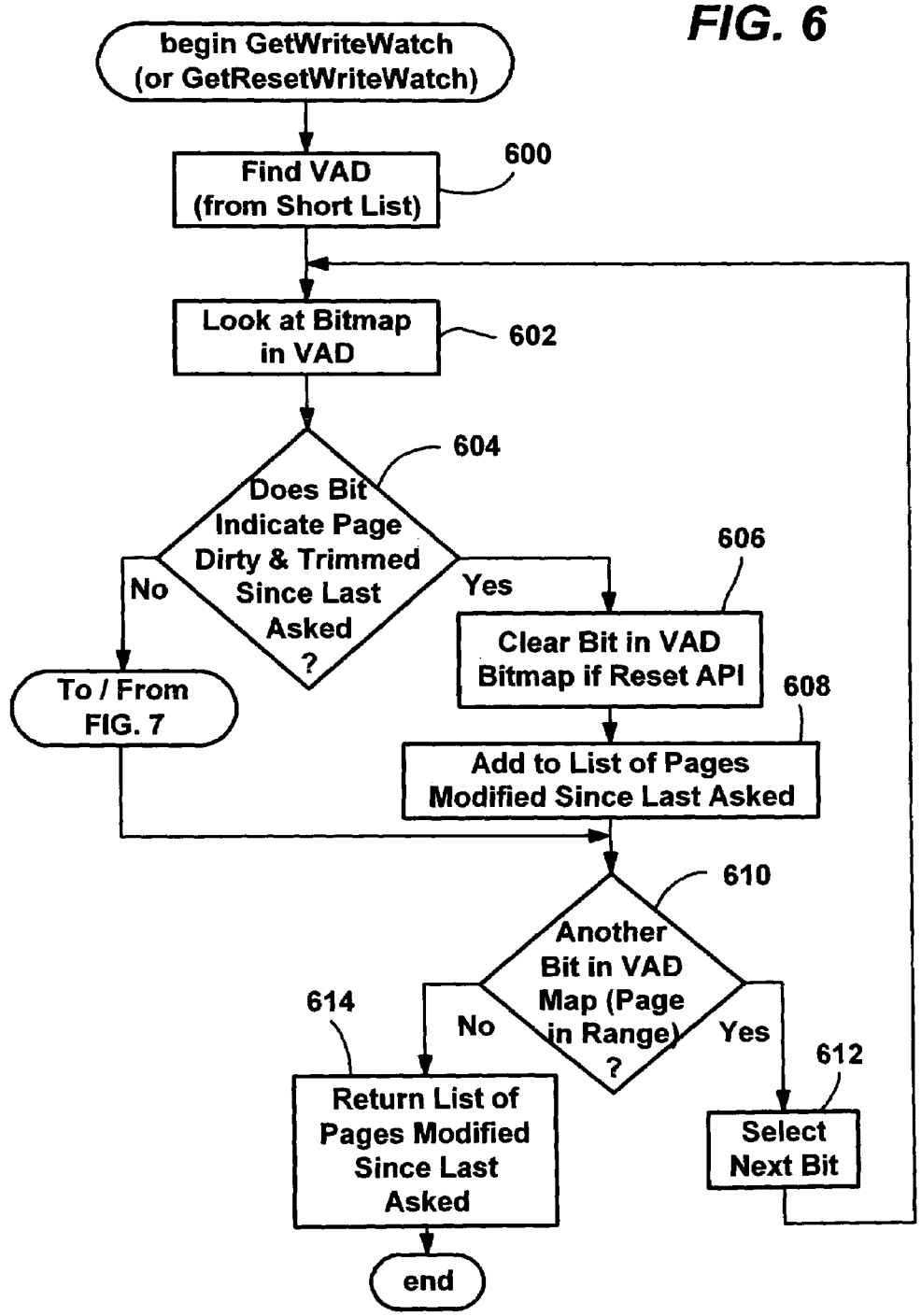

FIGS. 6 and 7 comprise a flow diagram that represents the general logic performed by the memory manager 68 when one of the API calls is received requesting write-watch status on a range of virtual page addresses. First, at step 600, the relevant VAD for the specified range is located by examining the short list 80 of write-watched ranges for the specified process $70_1$. Although not shown, it can be readily appreciated that an error or the like may be returned if a specified range is not found in the write-watch list 80. Note that in one implementation, a single range is specified that corresponds to a single VAD, however it is feasible to allow multiple ranges to be specified in a single call, and/or ranges that span multiple VADs, even those not write-watched (e.g., with those non-write-watched ranges skipped over).

At step 602, the bitmap $78_1$ associated with the relevant VAD is examined beginning at the bit corresponding to the first virtual page address in the specified range. Step 604 tests the bit, i.e., to determine whether the bit's value indicates that the page is modified (and, as described above, was trimmed since last asked). If so, step 604 branches to step 606 wherein the bit is cleared (if this is the reset API) and at step 608 the virtual page address identity is added to the information (e.g., the array 76 or bitmap or the like) to be returned to the caller (step 614). Steps 610–612 generally repeat the process for the remainder of the specified range, with the information returned to the caller at step 614.

Returning to step 604, if the bit is not set, then the write-watch process 74 needs to look further to determine whether the virtual page address was modified since last asked (and reset). To this end, step 604 branches to step 700 of FIG. 7.

At step 700, the page directory entry (PDE) of the virtual page address under scrutiny is accessed, and at step 702 is evaluated to determine if this page (and any others to which this PDE corresponds) have been trimmed to disk, i.e., whether the PTE is valid or invalid. If invalid (trimmed), then the write-watch bitmap $78_1$ in the VAD accurately reflects the modified/unmodified state of each virtual page address mapped by this PDE. Steps 704–712 rapidly traverse the bitmap $78_1$ recording modified pages until either the end of the range is reached or the pages in the PDE are exhausted. As can be readily appreciated, running the bitmap $78_1$ in this manner provides a significant performance improvement, as, for example, in one implementation a PDE may have 1,024 page table entries therein, allowing large sets of trimmed virtual pages to be rapidly processed. When either the requested range (e.g., the bitmap) or the PDE is exhausted, the write-watch process 74 returns to step 610 of FIG. 6 to either move on to the next bit/virtual page address (step 612) or return the write-watch information (step 614), as described above.

If, however, at step 702 the page directory for the virtual page address being evaluated does not indicate that the virtual page address was trimmed, the write-watch process 74 instead branches to step 714 where it looks to the PTE of the page (represented by the current bit) to determine whether the virtual page address is modified (although not trimmed), which is determined by the flag 88 as described above. If not modified, (step 716), the process returns to step 610 of FIG. 6, to either move on to the next bit/virtual page address (step 612) or return the write-watch information (step 614), as described above. However, if via steps 714 and 716 the PTE indicates that the virtual page address is modified, the operations represented by steps 718 and 720 are executed (if in the reset API case), to set the flag 92 in the PFN database 90 (step 718) and clear the flag 88 in the PTE (step 720) for this virtual page address as described above, interrupting multiple processors if present, as described above. The virtual page address is added to the information (e.g., the array 76 of modified pages to be returned to the caller) at step 722. The process then returns to step 610 of FIG. 6 to either move on to the next bit (representing the next virtual page address) at step 612, or return the write-watch information at step 614, as described above.

In this manner, write-watch itself is extremely fast, as during normal operation only a single bit per virtual page address needs to be set, and only when that page is modified and trimmed to disk. When later requested to report the write-watch results, the bitmap for a VAD is traversed extremely rapidly, only checking the PTE when pages are valid.

As can be seen from the foregoing detailed description, there is provided a method and system for efficiently performing write-watch on ranges of memory. Indeed, tests have shown increases in performance of up to ten times relative to other known write-watch techniques. The write-watch technique of the present invention adds as little as one bit to each write-watch page, and does not significantly impact system performance in normal system operation, only adding extra time to track writes when disk swapping under memory pressure.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, comprising:
   maintaining information indicative of whether a page has been modified since last checked;
   modifying the information upon the page being trimmed to storage to indicate that the page has been modified since last checked;
   receiving a request as to whether the page has been modified since last checked; and indicating in response to the request that the page has been modified since last checked based on the information.

2. The computer-readable medium of claim 1, wherein the information is maintained in a bitmap having one bit for each page of a plurality of pages, the plurality of pages including the page, each bit indicating whether its corresponding page has been changed since last checked.

3. The computer-readable medium of claim 2, wherein the bitmap is subject to modification each time one of the plurality of pages is trimmed to storage, the modification to the bitmap indicating that the page trimmed to storage has been modified since last checked.

4. The computer-readable medium of claim 1, wherein the request comprises a request for modification information for a range of a plurality of pages including the page, and wherein the response indicates whether each page in the range of pages has been changed since last checked.

5. The computer-readable medium of claim 4, wherein the plurality of pages were allocated by a process.

6. The computer-readable medium of claim 5, wherein the plurality of pages include all allocated pages of the process.

7. The computer-readable medium of claim 4, wherein the pages are virtual pages.

8. The computer-readable medium of claim 1, wherein the information is maintained in association with a linked-list comprising all virtual address descriptors that are watched for modification since last checked.

9. A method of write-watching memory, comprising
receiving a request as to whether a page has been modified since last checked;
determining whether a page directory indicates that a plurality of pages including the page have been trimmed to storage; and
if the plurality of pages have been trimmed to storage, examining information that indicates whether the page was modified since last checked and indicating whether the page was modified based on the information, wherein upon the page being trimmed to storage, the information is updated to indicate that the page was modified.

10. The method of claim 9, wherein the request comprises a request as to whether a range of pages have been modified since last checked, the range of pages including the page.

11. The method of claim 9, wherein determining whether the page directory indicates that the plurality of pages have been trimmed to storage comprises checking a flag in the page directory.

12. The method of claim 9, wherein the information indicates that the page was modified since last checked if the page was trimmed to storage since last checked.

13. The method of claim 9, further comprising, if the plurality of pages have not been trimmed to storage, examining a page table entry corresponding to the page to determine whether the page has been modified since last checked and indicating whether the page has been modified.

14. The method of claim 13, further comprising resetting data in the page table entry to indicate that the page has not been modified since last checked.

15. The method of claim 14, further comprising modifying information in memory other than the page table entry to indicate that the page is dirty.

16. The method of claim 15, wherein the memory other than the page table entry indicates which physical pages have been modified since they have been read from storage.

17. The method of claim 15 wherein the memory other than the page table entry is consulted when trimming pages to storage.

18. A computer-readable medium having computer-executable instructions, which when executed perform the method of claim 9.

19. A computer-readable medium having computer-executable instructions, comprising:
checking data other than a page table entry to determine whether a page has been trimmed to storage since last checked; and
if the page has been trimmed to storage since last checked, indicating that the page has been modified since last checked,
otherwise, checking the page table entry to determine whether the page has been modified since last checked and indicating whether the page has been modified since last checked.

20. The computer-readable medium of claim 19, wherein checking the page table entry to determine whether the page has been modified since last checked occurs only when the page remains in memory.

* * * * *